United States Patent
Haberstroh et al.

(10) Patent No.: US 8,683,919 B2
(45) Date of Patent: Apr. 1, 2014

(54) MODULAR STRAP FEED HEAD WITH FORMING WHEELS

(75) Inventors: James A. Haberstroh, Vernon Hills, IL (US); Jeffrey D. Termanas, Rolling Meadows, IL (US); Wayne J. Thas, Arlington Heights, IL (US); Michael J. McMahon, Palatine, IL (US); Robert G. Kobetsy, Chicago, IL (US)

(73) Assignee: Illinois Tool Works Inc., Glenview, CA (US)

( * ) Notice: Subject to any disclaimer, the term of this patent is extended or adjusted under 35 U.S.C. 154(b) by 7 days.

(21) Appl. No.: 13/599,873

(22) Filed: Aug. 30, 2012

(65) Prior Publication Data

US 2013/0068117 A1    Mar. 21, 2013

Related U.S. Application Data

(60) Provisional application No. 61/535,219, filed on Sep. 15, 2011.

(51) Int. Cl.
    *B65B 13/18*    (2006.01)
    *B29C 53/04*    (2006.01)

(52) U.S. Cl.
    CPC ............ B65B 13/18 (2013.01); *B29C 53/043* (2013.01)
    USPC ............. 100/26; 100/25; 100/29; 100/33 PB; 53/589

(58) Field of Classification Search
    USPC ........ 100/25, 26, 29, 32, 33 PB; 53/582, 589; 226/88; 242/566, 615.2, 615.21, 615.4
    See application file for complete search history.

(56) References Cited

U.S. PATENT DOCUMENTS

| | | | |
|---|---|---|---|
| 3,224,705 A | 12/1965 | Nash | |
| 3,320,225 A | 5/1967 | Bradbury | |
| 4,120,239 A * | 10/1978 | Pasic et al. | 100/26 |
| 4,516,488 A * | 5/1985 | Bartzick et al. | 100/4 |
| 5,379,576 A * | 1/1995 | Koyama | 53/589 |
| 5,778,643 A * | 7/1998 | Tacchini | 53/589 |
| 2003/0010225 A1 | 1/2003 | Pearson et al. | |
| 2011/0271493 A1 | 11/2011 | Enriquez et al. | |

FOREIGN PATENT DOCUMENTS

| | | |
|---|---|---|
| EP | 1002720 A2 | 5/2000 |
| JP | 63109039 A | 5/1988 |

OTHER PUBLICATIONS

International Search Report for PCT/US2012/054726 dated Jan. 3, 2013.

* cited by examiner

*Primary Examiner* — Jimmy T Nguyen
(74) *Attorney, Agent, or Firm* — Levenfeld Pearlstein, LLC (57) ABSTRACT

A strap forming assembly for a strapping machine includes a first forming wheel having a circumferential groove formed in a rim thereof and a second forming wheel cooperating with the first forming wheel and having a mating a circumferential crown extending therefrom. The first and second forming wheels cooperate to define a forming wheel nip therebetween. The forming wheel nip is non-planar. Strapping material fed into the forming wheel nip is permanently, longitudinally deformed.

21 Claims, 5 Drawing Sheets

MODULAR STRAP FEED HEAD WITH FORMING WHEELS

CROSS-REFERENCE TO RELATED APPLICATION DATA

This application claims the benefit of priority of U.S. Provisional patent application Ser. No. 61/535,219, filed Sep. 15, 2011, the disclosure of which is incorporated herein in its entirety.

BACKGROUND

Strapping machines are known for securing straps around loads. In a typical arrangement, strap material is fed from dispenser into a strapping machine. The strap is fed through a feed head and a sealing head and into a strap chute. Once the strap is conveyed beyond the feed head, it is "pushed" through the strap chute that forms an archway or like path around the load.

The strap continues to be "pushed" until the lead end of the strap returns to the sealing head. Once the strap returns to the sealing head, the lead end is gripped in a gripper, and overlapping course of strap material are sealed to one another, as by welding, to form the strap joint. The strap is then severed downstream of the strap joint and the load removed from the strapping machine. A subsequent lead end is then ready to be pushed through the strap chute to strap the next load.

In an effort to reduce the costs associated with such packaging or bundling operations, strap material has been made thinner as it has been made stronger. While this has resulted in material cost savings, the thinner strap tends to curl to a greater extent than thicker strap, and has less structure or is less rigid than thicker strap. As such, strap misfeeds can occur.

Efforts have been made to increase the column strength of the thinner strap. One such strap, disclosed in Pearson, US Publication 2008/0201911, and commonly assigned with the present application includes semi-circular ribs formed longitudinally along the strap to increase the column stiffness of the strap. While this ribbed strap exhibits increased column stiffness, the ribs increase the effective cross-sectional area of the strap which requires additional space when the strap is wound onto a reel. As such, equal size reels of flat and ribbed strap will carry less ribbed strap. Moreover, additional manufacturing steps are required to form the ribs in the strap and to assure that the edges of the strap remain flat for proper functioning of the strapping machine in which it is used.

Figure 7A:
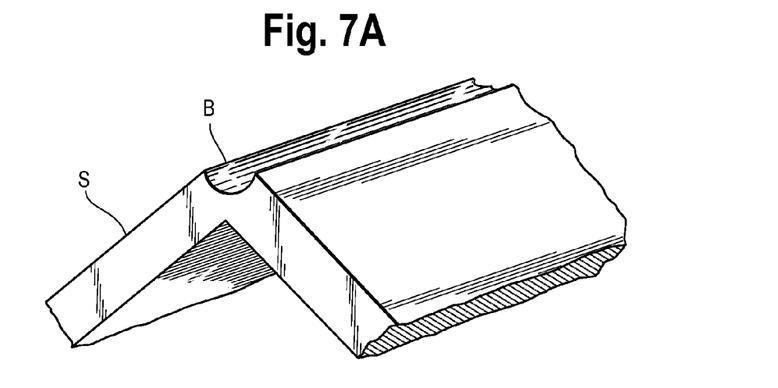
FIGS. 7A and 7B illustrate an exemplary section of strap, FIG. 7A being a perspective view of a formed or bent strap and FIG. 7B being an end view of the strap.
Figure 7B:
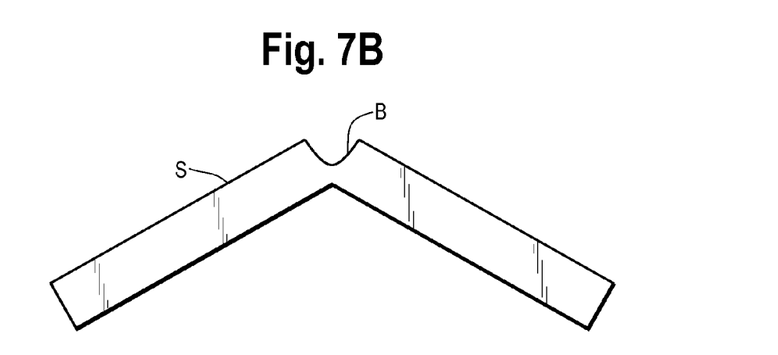

Another type of strap with increased column stiffness includes a flat strap with a slit or cut formed into a portion of the thickness of the strap, longitudinally along the strap, and is illustrated in FIGS. 7A and 7B. The strap is then bent so that the strap is folded along the length of the strap. Such a strap has the advantages of the ribbed strap, that is, increased column strength with reduced material, but has the further advantage of not increasing the effective cross-sectional area of the strap when the strap is stored flat. Such a strap can also be formed with two longitudinal bends. An example of such a strap is disclosed in copending, commonly assigned, Enriquez, U.S. patent application Ser. No. 13/047,482, the disclosure of which is incorporated herein by reference.

There has, however, not been a device to conform the flat strap to the bent strap configuration.

Accordingly, there is a need for a device to conform or form the bent strap configuration for use in a strapping machine. Desirably, such a device can be used with known strapping machines. More desirably, such a device can be installed in or made part of known strapping machines. More desirably still, such a device can be manufactured as part of a modular strapping head used in known strapping machines.

SUMMARY

A strap forming assembly is configured for use in a strapping machine for feeding a strapping material around a load, positioning, tensioning and sealing the strapping material around the load.

The strapping machine has a feed head for feeding the strapping material into the strapping machine, a strap chute through which the strapping material is passed and a sealing head to seal overlapping courses of the strapping material to one another. The strapping material traverses from the feed head, through the sealing head and the strap chute to define a strap path.

The strap forming assembly includes a first forming wheel having a circumferential groove formed in a rim thereof and a second forming wheel cooperating with the first forming wheel and having a mating a circumferential crown extending therefrom. The first and second forming wheels cooperate to define a forming wheel nip therebetween. The forming wheel nip is non-planar, and strapping material fed into the forming wheel nip is permanently, longitudinally deformed.

The circumferential crown, when viewed in cross-section, has first and second flat sides that define an apex and an apex angle. The circumferential groove, when viewed in cross-section, has first and second flat sides that define a nadir and a nadir angle.

The apex angle and the nadir angle can be substantially the same. The angle can be about 130 degrees to about 160 degrees, and preferably about 140 degrees to about 150 degrees.

In one embodiment, the first and second forming wheels are idler wheels and the assembly includes a guide for conveying the strapping material into the forming wheel nip.

A feed head for a strapping machine includes a strapping material inlet, a driven feed wheel and an idler feed wheel. The idler feed wheel is positioned to cooperate with the driven feed wheel and forms a nip therebetween. The feed head includes a strap forming assembly and a strapping material outlet.

The strap forming assembly has a first forming wheel having a circumferential groove formed in a rim thereof and a second forming wheel cooperating with the first forming wheel and having a mating a circumferential crown extending therefrom. The first and second forming wheels cooperate to define the forming wheel nip therebetween.

The forming wheel nip, when viewed in cross-section, is non-planar. The strap forming assembly is positioned downstream of the feed wheel nip. Strapping material fed into the forming wheel nip is permanently, longitudinally deformed.

The second forming wheel can be configured to cooperate with the driven feed wheel or the idler feed wheel, preferably, the driven feed wheel. In this arrangement, the cooperating wheel has an undercut or groove for receiving the circumferential crown and defines a nip therebetween. The nip is configured to pre-form the strapping material prior to introduction to the forming wheel nip.

The circumferential crown, when viewed in cross-section, has first and second flat sides that define an apex and an apex angle and the circumferential groove, when viewed in cross-section, has first and second flat sides that define a first nadir and a first nadir angle. The feed wheel groove, when viewed in cross-section has first and second flat sides that define a second nadir and a second nadir angle. Strapping material, passing through the nip, is pre-bent and subsequently passes through the forming wheel nip where a permanent longitudinal bend is formed therein.

A strapping machine is disclosed that includes a feed head for feeding strapping material into the strapping machine, a strap chute through which the strapping material is passed, a sealing head to seal overlapping courses of the strapping material to one another and a strap forming assembly. Strapping material traverses from the feed head, through sealing head and the strap chute to define a strap path.

The strap forming assembly has a first forming wheel having a circumferential groove formed in a rim thereof and a second forming wheel cooperating with the first forming wheel and having a mating a circumferential crown extending therefrom. The first and second forming wheels cooperate to define a forming wheel nip therebetween, that is non-planar. Strapping material fed into the forming wheel nip is permanently, longitudinally deformed.

The forming wheels' circumferential crown and groove can be formed with flat sides that define an apex and a nadir. Alternately, the circumferential crown and groove sides can be truncated forming a plateau and a flat central region, respectively, therebetween. In such an embodiment, the strapping material, passing through the forming wheel nip, has two permanent longitudinal bends formed therein.

The feed head can be modular relative to the strapping machine and the forming assembly can be formed as part of the feed head.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
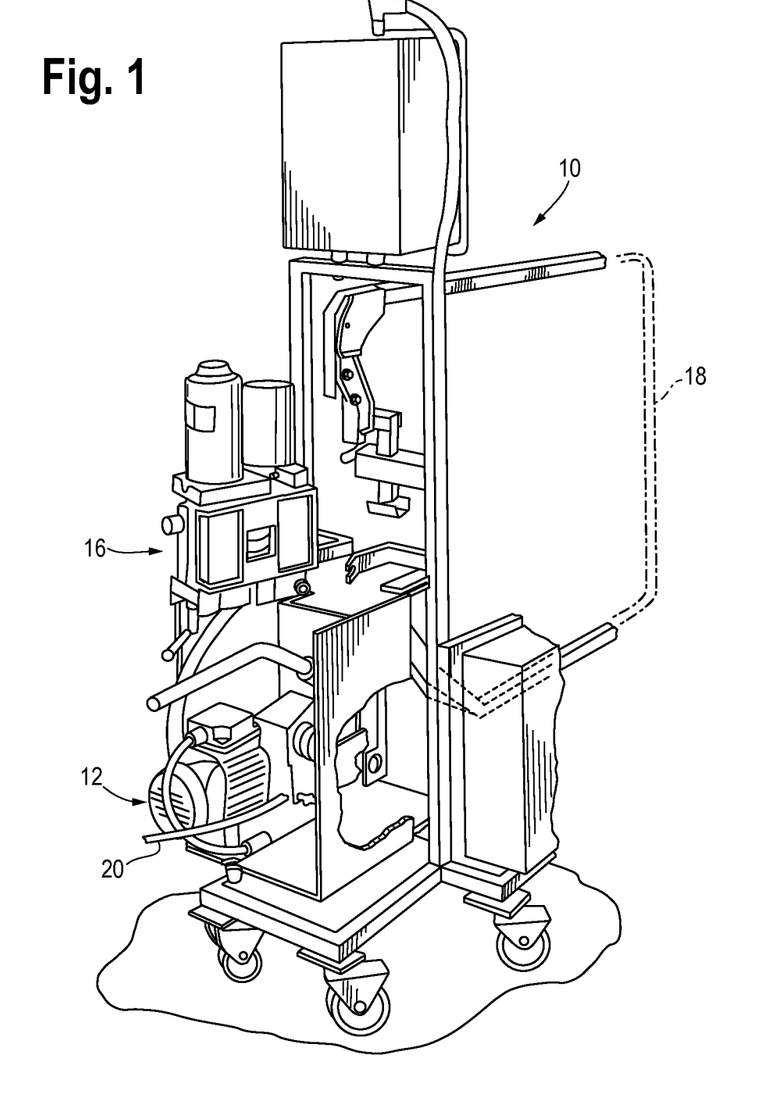
FIG. 1 illustrates a general layout of an exemplary strapping machine.

Referring to the figures and in particular to FIG. 1 there is shown an exemplary strapping machine 10 having a modular feed head 12 with a forming assembly 13 having forming wheels, indicated generally at 14. The strapping machine 10 further includes a sealing head 16, a strap chute 18 and a strap supply 20.

In a typical strapping cycle, strap S is fed, either directly or indirectly via the strap supply 20 to the feed head 12. The strap S is fed or pushed by the feed head 12, through the sealing head 16, through and around the strap chute 18 and back to the sealing head 16. In the sealing head 16, a lead end of the strap S is gripped, and the feed head 12 then reverses to retract the strap S. Retracting the strap S pulls the strap from the strap chute 18 onto the load (not shown).

The strap S is then tensioned around the load, the overlapping course of strap S are then sealed to one another, such as by welding, and the strap S around the load is separated from the strap feed 20. The load can then be off-loaded from the strapping machine 10 or moved (e.g., shifted or rotated) for application of another course of strap S.

Figure 2:
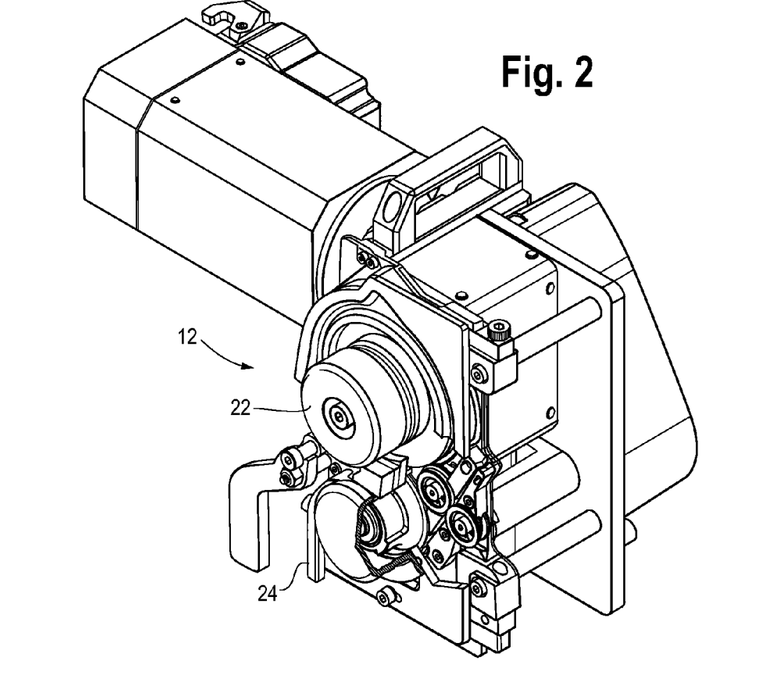
FIG. 2 is a perspective illustration of a modular feed head having a strap forming assembly with strap forming wheels.
Figure 3:
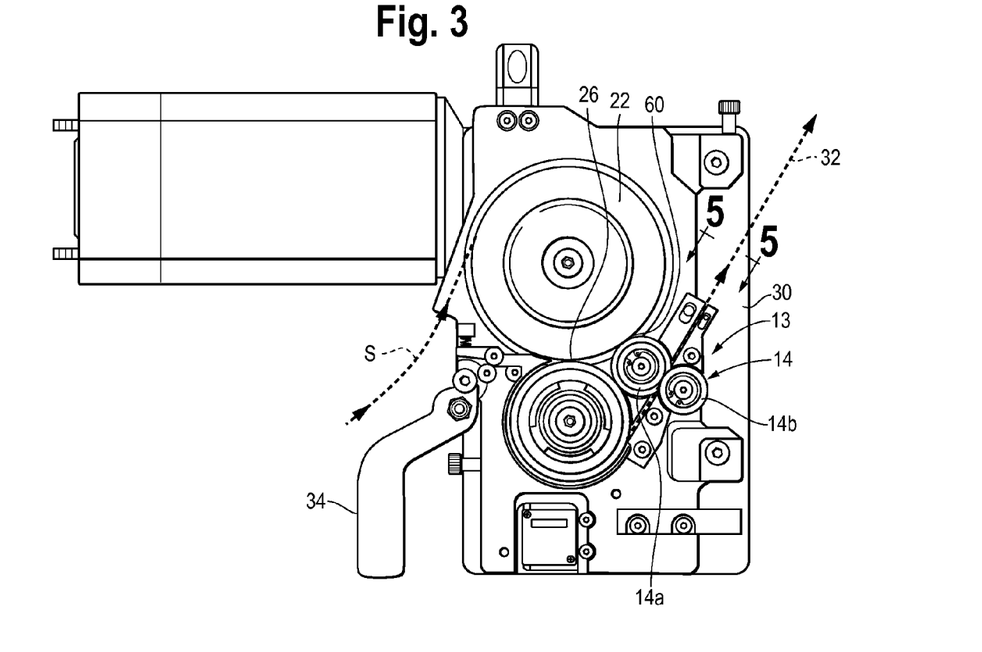
FIG. 3 is a front view of the feed head showing the strap forming assembly.

Referring now to FIGS. 2 and 3, there is shown a feed head 12. The feed head 12 includes first and second opposing feed wheels 22, 24. In the illustrated feed head 12, one of the wheels 22 is a driven wheel and the opposing wheel 24 is an idler wheel. A nip 26 is defined between the wheels 22, 24 through which the strap S traverses from the supply 20 to the strap chute 18. An inlet 28 to the feed wheels 22, 24 and an outlet 30 from the feed wheels 22, 24 define, in part, a strap path, indicated generally at 32.

Downstream of the feed wheels 22, 24, a pair of forming wheels 14a, 14b is disposed in the strap path 32. The forming wheels 14a, 14b are set within a guide 34 that extends from about the feed wheel outlet 30 toward the sealing head 16. A biased strap guide 36 is positioned downstream of the feed wheel outlet 30 and upstream of the guide 34 to maintain the strap S in contact with idler feed wheel 24.

Figure 4:
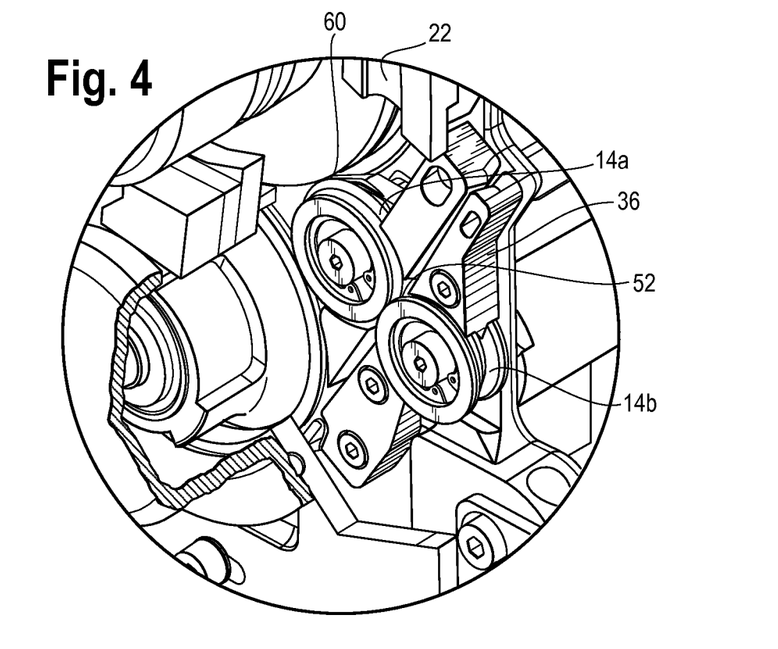
FIG. 4 is an enlarged view of the strap forming assembly and forming wheels.
Figure 5:
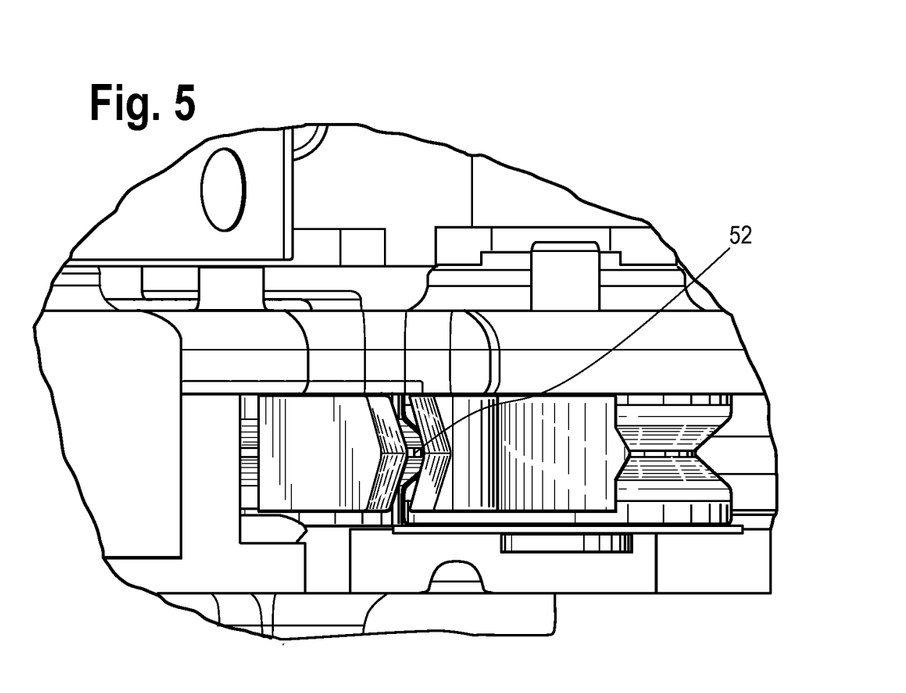
FIG. 5 is a sectional view taken along line A-A of FIG. 3.

Referring now to FIGS. 2, 4 and 5, in order to form a longitudinal bend (as indicated at B in FIG. 7) in the strap S, the forming wheels 14 include a first wheel 14a having a circumferential crown or peak 38 in the wheel rim 40 (the crowned wheel) and a second, mating, cooperating wheel 14b having a circumferential groove 42 formed in the wheel rim 44 (the grooved wheel).

Figure 6:
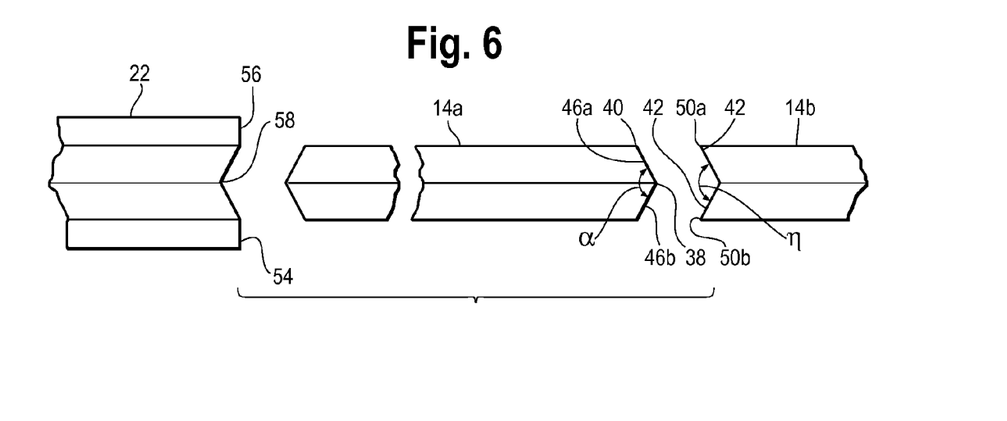
FIG. 6 illustrates the profile of the strap forming wheels and the feed wheel.

As can be seen in FIG. 6, the forming wheel nip or engagement region 52 formed by the wheels 14a, 14b is not flat. It will be appreciated by those skilled in the art that FIG. 6 is illustrated with the wheels 14a, 14b and 22 spaced from one another in an exaggerated view to illustrate the various cooperating surfaces, but that in operation, the wheels are sufficiently close to engage and move the strap S through the feed head 12.

The nip 52 defines a non-planar space between the wheels 14a, 14b. In the illustrated embodiment, the crown 38 is defined by first and second flat sides 46a,b that define an apex 48 having an apex angle $\alpha$. Likewise, the groove 42 is formed with first and second flat sides 50a,b that define a nadir 51 having a nadir angle $\eta$. Preferably, the apex angle $\alpha$ and the nadir angle $\eta$ are substantially the same and define an obtuse angle of about 130 to 160 degrees and preferably about 140 to 150 degrees. It will, however, be appreciated by those skilled in the art that the angles $\alpha$ and $\eta$ can vary from this range. The angles of the apex and nadir generally define the nip 52, which is configured to permanently deform or bend the strap S as it traverses between the wheels 14a, 14b, but to allow the strap S to readily move between the wheels 14a, 14b without too much resistance.

In the illustrated embodiment, the forming wheels 14a, 14b are idler wheels, that is, they are not driven, but are free to rotate as the strap S is fed between wheels 14a, 14b. The driving force for moving the strap S through the forming wheel nip 52 is provided by the feed wheels 22, 24.

As can be seen from FIGS. 4 and 5, the crowned wheel 14a is positioned in close proximity to the driven feed wheel 22. In this arrangement, a nip 60 is formed between the driven feed wheel 22 and the crowned wheel 14a. The feed wheel 22 can be formed having a flat peripheral rim or surface, or, as seen in FIG. 6, it can be formed with a rim 54 having flat edges 56 and a groove or undercut 58 that cooperates with the crowned wheel 14a. In this configuration, the feed wheel 22 and crowned wheel 14a cooperate to pre-bend the strap S prior to introduction to the forming wheel nip 52.

The strap path 32 through the feed head is illustrated in FIG. 3. Strap S enters the feed head 12, wraps around the driven feed wheel 22 and enters nip 60. As the strap S moves through the nip 60, it is pre-bent by cooperation of the crowned wheel 14a and the driven feed wheel 22.

The now pre-bent strap S then continues into the feed wheel nip 26, between the feed wheels 22, 24 and exits the nip 26 at about the biased strap guide 34. The strap guide 34 maintains the strap S in contact with the idler feed wheel 24. The strap S wraps around the idler feed wheel 24 and enters the forming wheel guide 36, where the strap S is guided into the forming wheel nip 52, between the forming wheels 14a, 14b, where the strap S is deformed or bent to its final shape (angle). The strap S then exits the feed head 12 and is conveyed to the sealing head 16.

Figure 8:
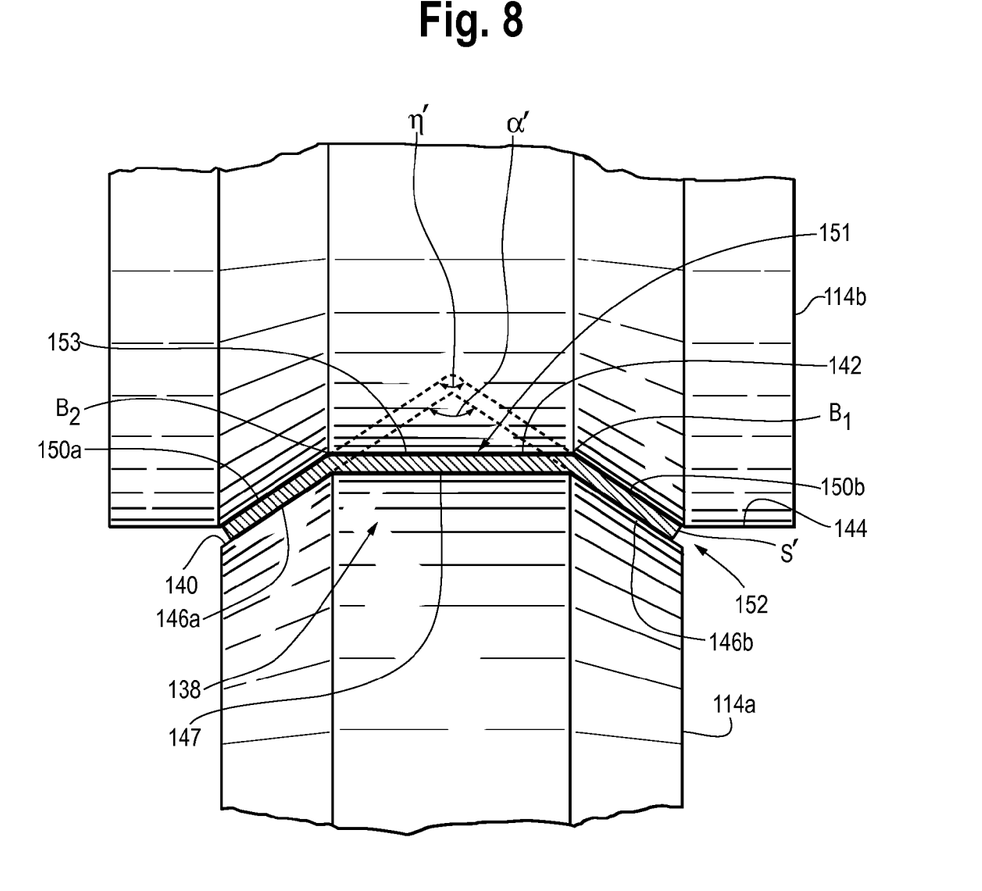
FIG. 8 illustrates another embodiment of the forming wheels.

FIG. 8 illustrates another embodiment of the forming wheels 114a, 114b. In this embodiment, the forming wheels 114a, 114b are configured to provide two bends $B_1$, $B_2$ in the strap S' rather than a single bend. A first wheel 114a has a circumferential crown or peak 138 in the wheel rim 140 (the crowned wheel). A second, mating, cooperating wheel 114b has a circumferential groove 142 formed in the wheel rim 144 (the grooved wheel). The forming wheel nip or engagement region 152 formed by the wheels 114a, 114b is non-planar. The crown 138 is defined by first and second sides 146a, 146 that angle away from one another as seen in the embodiment of FIG. 6, but are truncated, terminating at a flat region or plateau 147. The sides 146a, 146b are formed at an apex angle α' similar to that of the apex 52.

The grooved wheel 114b includes a groove 142 that is formed with first and second sides 150a, 150b that define a flat central region or a truncated base 153. The angled sides 150a, 150b are formed at a nadir angle η' similar to that of the nadir 51. Preferably, the truncated apex angle α' and the truncated or flattened nadir angle η' are substantially the same and define an obtuse angle of about 130 to 160 degrees and preferably about 140 to 150 degrees. It will, however, be appreciated by those skilled in the art that the angles α' and η' can vary from this range.

The angles α' and η' of the truncated apex and flattened nadir, respectively, generally define the nip 152, which is configured to permanently deform or bend the strap S as it traverses between the wheels 114a, 114b, but to allow the strap S to readily move between the wheels 114a, 114b without too much resistance. It will be appreciated that this embodiment forms two bends $B_1$, $B_2$ in the strap S' with a central planar region R, rather than a single bend in the strap.

It will be appreciated that the illustrated strap forming assembly 13 is contained within the feed head 12 and, when the feed head 12 is of a modular design, the forming assembly 13 is contained within the feed head 12 module. Such an arrangement is advantageous in that existing feed head modules can be readily replaced with a feed head module 12 having the forming wheels 14a, 14b and 114a, 114b, without modification to the strapping machine 10. Moreover, in that the forming wheel assembly 13 is passive—that is, the forming wheels 14a, 14b and 114a, 114b are idler wheels and are not driven—no additional power, nor additional powered components are needed.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A strap forming assembly in a strapping machine for feeding a strapping material around a load, positioning, tensioning and sealing the strapping material around the load, the strapping machine having a feed head for feeding the strapping material into the strapping machine, the feed head having a driven feed wheel includes a feed wheel groove, a strap chute through which the strapping material is passed and a sealing head to seal overlapping courses of the strapping material to one another, the strapping material traversing from the feed head, through sealing head and the strap chute to define a strap path, the strap forming assembly, comprising:
   a first forming wheel having a circumferential groove formed in a rim thereof; and
   a second forming wheel cooperating with the first forming wheel and the driven feed wheel, the second forming wheel having a mating a circumferential crown extending therefrom,
   wherein the first and second forming wheels cooperate to define a forming wheel nip therebetween, the forming wheel nip being non-planar and wherein strapping material fed into the forming wheel nip is permanently, longitudinally deformed, and
   wherein the second forming wheel cooperates with the driven feed wheel, the driven feed wheel having a groove for receiving the circumferential crown and defining a nip therebetween, the nip configured to pre-form the strapping material prior to introduction to the forming wheel nip.

2. The strap forming assembly of claim 1 wherein the first and second forming wheels are idler wheels.

3. The strap forming assembly of claim 1 including a guide for conveying the strapping material into the forming wheel nip.

4. The strap forming assembly of claim 1 wherein the circumferential crown, when viewed in cross-section, has first and second sides that define an apex angle, and wherein the circumferential groove, when viewed in cross-section, has first and second sides that define a nadir angle, and wherein the strapping material, passing through the forming wheel nip, has a permanent longitudinal bend formed therein.

5. The strap forming assembly of claim 4 wherein the apex angle and the nadir angle are substantially the same.

6. The strap forming assembly of claim 5 wherein the apex angle and the nadir angle are about 130 degrees to about 160 degrees.

7. The strap forming assembly of claim 6 wherein the apex angle and the nadir angle are about 140 degrees to about 150 degrees.

8. The strap forming assembly of claim 4 wherein the circumferential crown first and second sides are flat, defining an apex and wherein the circumferential groove first and second sides are flat, defining a nadir.

9. The strap forming assembly of claim 4 wherein the circumferential crown first and second sides are truncated, forming a plateau therebetween, and wherein the circumferential groove first and second sides are truncated, forming a flat central region therebetween, and wherein the strapping material, passing through the forming wheel nip, has two permanent longitudinal bends formed therein.

10. A feed head in a strapping machine for feeding a strapping material around a load, positioning, tensioning and sealing the strapping material around the load, the feed head comprising:
    a strapping material inlet;
    a driven feed wheel having a feed wheel groove;
    an idler feed wheel having a feed wheel groove, the idler feed wheel positioned to cooperate with the driven feed wheel and forming a feed wheel nip therebetween;
    a strap forming assembly, the strap forming assembly having a first forming wheel having a circumferential groove formed in a rim thereof and a second forming wheel cooperating with the first forming wheel and having a mating a circumferential crown extending therefrom, the first and second forming wheels cooperating to define a forming wheel nip therebetween, the forming wheel nip, when viewed in cross-section, being non-planar, the strap forming assembly positioned downstream of the feed wheel nip, and wherein strapping material fed into the forming wheel nip is permanently, longitudinally deformed; and
    a strapping material outlet,
    wherein the second forming wheel cooperates with one of the driven feed wheel and the idler feed wheel, the cooperating one of the driven feed wheel and idler feed wheel having the feed wheel groove for receiving the circumferential crown and defining a nip therebetween, the nip configured to pre-form the strapping material prior to introduction to the forming wheel nip.

11. The feed head of claim 10 wherein the strap forming assembly is formed as part of the feed head.

12. The feed head of claim 10 wherein the second forming wheel cooperates with the driven feed wheel.

13. The feed head of claim 12 wherein the circumferential crown, when viewed in cross-section, has first and second sides that define an apex angle, and wherein the circumferential groove, when viewed in cross-section, has first and second sides that define a first nadir angle, and wherein the feed wheel groove, when viewed in cross-section has first and second sides that define a second nadir angle, and wherein strapping material, passing through the nip is pre-bent and passing through the forming wheel nip has a permanent longitudinal bend formed therein.

14. The feed head of claim 13 wherein the circumferential crown first and second sides are flat defining an apex, wherein the circumferential groove first and second sides are flat defining a first nadir and wherein the feed wheel groove first and second sides are flat, defining a second nadir.

15. The feed head of claim 13 wherein the circumferential crown first and second sides are truncated forming a plateau therebetween, wherein the circumferential groove first and second sides are truncated forming a flat central region therebetween, and wherein the feed wheel groove first and second sides are flat defining a second nadir, wherein the strapping material, passing through the forming wheel nip, has two permanent longitudinal bends formed therein.

16. A strapping machine, comprising:
    a feed head for feeding strapping material into the strapping machine, the feed head having a feed wheel;
    a strap chute through which the strapping material is passed;
    a sealing head to seal overlapping courses of the strapping material to one another, the strapping material traversing from the feed head, through sealing head and the strap chute to define a strap path; and
    a strap forming assembly having a first forming wheel having a circumferential groove formed in a rim thereof and a second forming wheel cooperating with the first forming wheel and having a mating a circumferential crown extending therefrom,
    wherein the first and second forming wheels cooperate to define a forming wheel nip therebetween, the forming wheel nip being non-planar and wherein strapping material fed into the forming wheel nip is permanently, longitudinally deformed, and
    wherein the second forming wheel cooperates with the feed wheel, the feed wheel having a groove for receiving the circumferential crown and defining a nip therebetween, the nip configured to pre-form the strapping material prior to introduction to the forming wheel nip.

17. The strapping machine of claim 16 wherein the strap forming assembly is formed as part of the feed head.

18. The strapping machine of claim 17, wherein the feed head is modular relative to the strapping machine.

19. The strapping machine of claim 16 wherein the circumferential crown, when viewed in cross-section, has first and second sides that define an apex angle, and wherein the circumferential groove, when viewed in cross-section, has first and second sides that define a first nadir angle, and wherein the groove of the feed wheel, when viewed in cross-section has first and second sides that define a second nadir angle, and wherein strapping material, passing through the nip is pre-bent and passing through the forming wheel nip has a permanent longitudinal bend formed therein.

20. The strapping machine of claim 19 wherein the circumferential crown first and second sides are flat, defining an apex, wherein the circumferential groove first and second sides are flat, defining a first nadir and wherein the feed wheel groove first and second sides are flat, defining a second nadir.

21. The feed head of claim 19 wherein the circumferential crown first and second sides are truncated, forming a plateau therebetween, wherein the circumferential groove first and second sides are truncated, forming a flat central region therebetween, and wherein the feed wheel groove first and second sides are flat, defining a second nadir, wherein the strapping material, passing through the forming wheel nip, has two permanent longitudinal bends formed therein.

* * * * *

UNITED STATES PATENT AND TRADEMARK OFFICE
CERTIFICATE OF CORRECTION

PATENT NO. : 8,683,919 B2
APPLICATION NO. : 13/599873
DATED : April 1, 2014
INVENTOR(S) : Haberstroh et al.

It is certified that error appears in the above-identified patent and that said Letters Patent is hereby corrected as shown below:

On title page, item (75), Inventors, line 6, "Kobetsy" to read as --Kobetsky--.

On title page, item (73), Assignee, line 1, "Glenview, CA" to read as --Glenview, IL--.

Signed and Sealed this
Thirteenth Day of January, 2015

Michelle K. Lee
*Deputy Director of the United States Patent and Trademark Office*